United States Patent
Koteshwar Srinath et al.

(10) Patent No.: US 12,278,782 B2
(45) Date of Patent: Apr. 15, 2025

(54) APPARATUSES, METHODS AND COMPUTER PROGRAM USING CHANNEL MEASUREMENT DATA FOR A PRIMARY COMPONENT CARRIER

(71) Applicant: Nokia Technologies Oy, Espoo (FI)

(72) Inventors: Pavan Koteshwar Srinath, Orsay (FR); Fahad Syed Muhammad, Orsay (FR); Afef Feki, Sceaux (FR); Veronique Capdevielle, Magny les Hameaux (FR)

(73) Assignee: Nokia Technologies Oy, Espoo (FI)

( * ) Notice: Subject to any disclaimer, the term of this patent is extended or adjusted under 35 U.S.C. 154(b) by 311 days.

(21) Appl. No.: 17/794,310

(22) PCT Filed: Jan. 24, 2020

(86) PCT No.: PCT/EP2020/051784
§ 371 (c)(1),
(2) Date: Jul. 21, 2022

(87) PCT Pub. No.: WO2021/148136
PCT Pub. Date: Jul. 29, 2021

(65) Prior Publication Data
US 2023/0055959 A1   Feb. 23, 2023

(51) Int. Cl.
*H04L 5/00* (2006.01)
*G06N 3/08* (2023.01)

(52) U.S. Cl.
CPC ............. *H04L 5/0058* (2013.01); *G06N 3/08* (2013.01); *H04L 5/001* (2013.01); *H04L 5/0098* (2013.01)

(58) Field of Classification Search
CPC .......... G06N 3/045; G06N 3/08; G06N 20/10; H04L 5/001; H04L 5/0058; H04L 5/0098
See application file for complete search history.

(56) References Cited

U.S. PATENT DOCUMENTS

| 10,757,741 B1* | 8/2020 | Oroskar ................ H04W 24/00 |
| 2011/0028148 A1* | 2/2011 | Lee .......................... H04L 5/001 |
| | | 455/435.2 |

(Continued)

OTHER PUBLICATIONS

Khan et al., "Carrier aggregation/channel bonding in next generation cellular networks: Methods and challenges", IEEE network, vol. 28, No. 6, pp. 34-40, 2014. (Year: 2014).*

(Continued)

*Primary Examiner* — Shah M Rahman
(74) *Attorney, Agent, or Firm* — McCarter & English, LLP (57) ABSTRACT

An apparatus, method and computer program is described including: obtaining first channel measurement data for a primary component carrier used for communications between a device and a network node of a mobile communication system; providing the first channel measurement data as an input to an algorithm to obtain a first embedding output; comparing the first embedding output with embedding outputs of a plurality of reference channel measurement data input to said algorithm to identify a closest reference channel measurement data to the first channel measurement data; identifying a set of reference channel information associated with the identified closest reference channel measurement data, wherein the identified set of reference channel information includes a carrier aggregation policy defining one or more secondary communication channels; and setting a carrier aggregation policy for the primary component carrier in accordance with the carrier aggregation policy.

14 Claims, 8 Drawing Sheets

(56) References Cited

U.S. PATENT DOCUMENTS

| | | | |
|---|---|---|---|
| 2011/0267978 A1* | 11/2011 | Etemad | H04L 5/0094 |
| | | | 370/254 |
| 2012/0039273 A1* | 2/2012 | Nam | H04W 52/325 |
| | | | 455/450 |
| 2017/0005775 A1* | 1/2017 | Cheng | H04W 40/005 |
| 2017/0061315 A1* | 3/2017 | Leonard | G06F 16/2462 |
| 2018/0351786 A1* | 12/2018 | Pope | H04L 41/0654 |
| 2019/0108460 A1* | 4/2019 | Chien | G06Q 10/063 |
| 2019/0280845 A1 | 9/2019 | Bedekar | |
| 2020/0117580 A1* | 4/2020 | Lekivetz | G06F 11/368 |
| 2021/0182658 A1* | 6/2021 | Wang | G06N 3/044 |
| 2022/0295295 A1* | 9/2022 | Moosavi | H04W 24/08 |
| 2024/0236712 A1* | 7/2024 | Tran | H01Q 3/44 |

OTHER PUBLICATIONS

Ryden, Henrik et al., "Predicting Strongest Cell on Secondary Carrier using Primary Carrier Data", 2018 IEEE Wireless Communications and Networking Conference Workshops, Apr. 15, 2018, pp. 137-142.

Dahlman, Erik et al., "Artificial Intelligence in Future Evolution of Mobile Communication", 2019 International Conference on Artificial Intelligence in Information and Communication, Feb. 11, 2019, pp. 102-106.

Lee, Mengyuan et al., "Graph Embedding based Wireless Link Scheduling with Few Training Samples", Cornell University Library, Jul. 17, 2019.

* cited by examiner

*Fig. 12B*

APPARATUSES, METHODS AND COMPUTER PROGRAM USING CHANNEL MEASUREMENT DATA FOR A PRIMARY COMPONENT CARRIER

CROSS REFERENCE TO RELATED APPLICATION

This patent application is a U.S. National Stage application of International Patent Application Number PCT/EP2020/051784 filed Jan. 24, 2020, which is hereby incorporated by reference in its entirety.

FIELD

The present specification relates to communication systems.

BACKGROUND

Carrier aggregation in mobile communication systems can enable multiple carriers having different centre frequencies to be provided. There remains a need for allocating resources in such communication systems.

SUMMARY

In a first aspect, this specification describes an apparatus comprising means for performing: obtaining first channel measurement data for a primary component carrier used for communications between a device and a network node of a mobile communication system; providing the first channel measurement data as an input to an algorithm to obtain a first embedding output; comparing the first embedding output with embedding outputs of a plurality of reference channel measurement data input to said algorithm to identify a closest reference channel measurement data to the first channel measurement data; identifying a set of reference channel information associated with the identified closest reference channel measurement data, wherein the identified set of reference channel information comprises a carrier aggregation policy defining one or more secondary communication channels; and setting a carrier aggregation policy for the primary component carrier for communications between the device and the network node of the mobile communication system in accordance with the carrier aggregation policy of the identified set of reference channel measurement data. Each embedding output obtained from the algorithm may be a lower dimensional representation of the channel measurement data of the respective primary component carrier.

In some example embodiments, the means are further to perform: identifying the closest reference channel measurement data by identifying the reference channel measurement data of the plurality with an embedding output that is closest to the first embedding output.

The algorithm may be implemented using a triplet network having a plurality of parameters that are trainable using a triplet loss function.

The secondary communication channels of the carrier aggregation policy may be arranged in an ordered list.

The channel measurement data for each primary component carrier may comprise channel quality information, channel state information or similar data.

The means may comprise: at least one processor; and at least one memory including computer program code, the at least one memory and computer program code configured to, with the at least one processor, cause the performance of the apparatus.

In a second aspect, this specification describes an apparatus comprising means for performing: obtaining a plurality of sets of training data, wherein each set of the plurality of training data comprises: first channel measurement data for a primary component carrier used for communications between a device and a network node of a mobile communication system; a primary channel identifier for said primary component carrier; and an ordered list of secondary channel identifiers for secondary component carriers for communications between the device and the network node; identifying one or more sets of reference data (e.g. anchors) from the plurality of sets of training data, wherein each reference data set has a different combination of primary and secondary channel identifiers to all other sets of reference data; identifying one or more sets of matching data sets (e.g. positives) for each reference data set from the plurality of sets of training data, wherein each matching data set has the same combination of primary and secondary channel identifiers as the respective reference data set; identifying one or more sets of non-matching data sets (e.g. negatives) for each reference data set from the plurality of sets of training data, wherein each non-matching data set has a different combination of primary and secondary channel identifiers to the respective reference data set; and training trainable parameters of an algorithm by minimising a loss function until, for all sets of matching data, outputs of the algorithm in response to the matching data set are closer to an output of the algorithm in response to the corresponding reference data set than to an output of the algorithm in response to any other reference data set.

In some example embodiments, the loss function is a triplet loss function. The algorithm may be implemented using a triplet network having a plurality of parameters that are trainable using said triplet loss function. The said loss function may be associated with a plurality of triplets to train the algorithm, wherein each triplet comprises: channel measurement data of a first reference data set of the one or more sets of reference data (e.g. anchor data); channel measurement data of one of the matching data sets (e.g. positives) for the respective first reference data set; and channel measurement data of one of the non-matching data sets (e.g. negatives) for the respective first reference data set.

In some example embodiments, the means are further configured to perform: determining whether training of the trainable parameters of the triplet network is validated by: providing channel measurement data of each of a plurality of identified matching data sets as an input to the algorithm to obtain a plurality of matching embedding outputs; and determining whether each of the plurality of matching embedding outputs is closer to an embedding output of the corresponding reference data set than to an embedding output of any other reference data set and, if so, determining that the algorithm is validated.

The means may be further configured to perform one or more of: storing the algorithm; storing the one or more sets of reference data; or storing a set of embedding outputs, wherein each embedding output is generated by applying first channel measurement data for the primary component carrier of the respective reference data set to the algorithm.

The channel measurement data for each primary component carrier may comprise channel quality information, channel state information or similar data.

The means may comprise: at least one processor; and at least one memory including computer program code, the at least one memory and computer program code configured to, with the at least one processor, cause the performance of the apparatus.

In a third aspect, this specification describes a method comprising: obtaining first channel measurement data for a primary component carrier used for communications between a device and a network node of a mobile communication system; providing the first channel measurement data as an input to an algorithm to obtain a first embedding output; comparing the first embedding output with embedding outputs of a plurality of reference channel measurement data input to said algorithm to identify a closest reference channel measurement data to the first channel measurement data; identifying a set of reference channel information associated with the identified closest reference channel measurement data, wherein the identified set of reference channel information comprises a carrier aggregation policy defining one or more secondary communication channels; and setting a carrier aggregation policy for the primary component carrier in accordance with the carrier aggregation policy of the identified set of reference channel measurement data. Each embedding output obtained from the algorithm may be a lower dimensional representation of the channel measurement data of the respective primary component carrier.

Some example embodiments further comprise identifying the closest reference channel measurement data by identifying the reference channel measurement data of the plurality with an embedding output that is closest to the first embedding output.

The algorithm may be implemented using a triplet network having a plurality of parameters that are trainable using a triplet loss function.

The secondary communication channels of the carrier aggregation policy may be arranged in an ordered list.

The channel measurement data for each primary component carrier may comprise channel quality information, channel state information or similar data.

In a fourth aspect, this specification describes a method comprising: obtaining a plurality of sets of training data, wherein each set of the plurality of training data comprises: first channel measurement data for a primary component carrier used for communications between a device and a network node of a mobile communication system; a primary channel identifier for said primary component carrier; and an ordered list of secondary channel identifiers for secondary component carriers for communications between the device and the network node; identifying one or more sets of reference data from the plurality of sets of training data, wherein each reference data set has a different combination of primary and secondary channel identifiers to all other sets of reference data; identifying one or more sets of matching data sets for each reference data set from the plurality of sets of training data, wherein each matching data set has the same combination of primary and secondary channel identifiers as the respective reference data set; identifying one or more sets of non-matching data sets for each reference data set from the plurality of sets of training data, wherein each non-matching data set has a different combination of primary and secondary channel identifier to the respective reference data set; and training trainable parameters of an algorithm by minimising a loss function until, for all sets of matching data, outputs of the algorithm in response to the matching data set are closer to an output of the algorithm in response to the corresponding reference data set than to an output of the algorithm in response to any other reference data set.

In some example embodiments, the loss function is a triplet loss function. The algorithm may be implemented using a triplet network having a plurality of parameters that are trainable using said triplet loss function. The said loss function may be associated with a plurality of triplets to train the algorithm, wherein each triplet comprises: channel measurement data of a first reference data set of the one or more sets of reference data (e.g. anchor data); channel measurement data of one of the matching data sets (e.g. positives) for the respective first reference data set; and channel measurement data of one of the non-matching data sets (e.g. negatives) for the respective first reference data set.

Some example embodiments further comprise: determining whether training of the trainable parameters of the triplet network is validated by: providing channel measurement data of each of a plurality of identified matching data sets as an input to the algorithm to obtain a plurality of matching embedding outputs; and determining whether each of the plurality of matching embedding outputs is closer to an embedding output of the corresponding reference data set than to an embedding output of any other reference data set and, if so, determining that the algorithm is validated.

The method may comprise one or more of: storing the algorithm; storing the one or more sets of reference data; or storing a set of embedding outputs, wherein each embedding output is generated by applying first channel measurement data for the primary component carrier of the respective reference data set to the algorithm.

The channel measurement data for each primary component carrier may comprise channel quality information, channel state information or similar data.

In a fifth aspect, this specification describes an apparatus configured to perform any method as described with reference to the third or fourth aspects.

In a sixth aspect, this specification describes computer-readable instructions which, when executed by computing apparatus, cause the computing apparatus to perform any method as described with reference to the third or fourth aspects.

In a seventh aspect, this specification describes a computer program comprising instructions for causing an apparatus to perform at least the following: obtaining first channel measurement data for a primary component carrier used for communications between a device and a network node of a mobile communication system; providing the first channel measurement data as an input to an algorithm to obtain a first embedding output; comparing the first embedding output with embedding outputs of a plurality of reference channel measurement data input to said algorithm to identify a closest reference channel measurement data to the first channel measurement data; identifying a set of reference channel information associated with the identified closest reference channel measurement data, wherein the identified set of reference channel information comprises a carrier aggregation policy defining one or more secondary communication channels; and setting a carrier aggregation policy for the primary component carrier in accordance with the carrier aggregation policy of the identified set of reference channel measurement data.

In an eighth aspect, this specification describes a computer program comprising instructions for causing an apparatus to perform at least the following: obtaining a plurality of sets of training data, wherein each set of the plurality of training data comprises: first channel measurement data for a primary component carrier used for communications between a device and a network node of a mobile communication system; a primary channel identifier for said primary component carrier; and an ordered list of secondary channel identifiers for secondary component carriers for communications between the device and the network node; identifying one or more sets of reference data from the plurality of sets of training data, wherein each reference data set has a different combination of primary and secondary channel identifiers to all other sets of reference data; identifying one or more sets of matching data sets for each reference data set from the plurality of sets of training data, wherein each matching data set has the same combination of primary and secondary channel identifiers as the respective reference data set; identifying one or more sets of non-matching data sets for each reference data set from the plurality of sets of training data, wherein each non-matching data set has a different combination of primary and secondary channel identifier to the respective reference data set; and training trainable parameters of an algorithm by minimising a loss function until, for all sets of matching data, outputs of the algorithm in response to the matching data set are closer to an output of the algorithm in response to the corresponding reference data set than to an output of the algorithm in response to any other reference data set.

In a ninth aspect, this specification describes a computer-readable medium (such as a non-transitory computer-readable medium) comprising program instructions stored thereon for performing at least the following: obtaining first channel measurement data for a primary component carrier used for communications between a device and a network node of a mobile communication system; providing the first channel measurement data as an input to an algorithm to obtain a first embedding output; comparing the first embedding output with embedding outputs of a plurality of reference channel measurement data input to said algorithm to identify a closest reference channel measurement data to the first channel measurement data; identifying a set of reference channel information associated with the identified closest reference channel measurement data, wherein the identified set of reference channel information comprises a carrier aggregation policy defining one or more secondary communication channels; and setting a carrier aggregation policy for the primary component carrier in accordance with the carrier aggregation policy of the identified set of reference channel measurement data.

In a tenth aspect, this specification describes a computer-readable medium (such as a non-transitory computer-readable medium) comprising program instructions stored thereon for performing at least the following: obtaining a plurality of sets of training data, wherein each set of the plurality of training data comprises: first channel measurement data for a primary component carrier used for communications between a device and a network node of a mobile communication system; a primary channel identifier for said primary component carrier; and an ordered list of secondary channel identifiers for secondary component carriers for communications between the device and the network node; identifying one or more sets of reference data from the plurality of sets of training data, wherein each reference data set has a different combination of primary and secondary channel identifiers to all other sets of reference data; identifying one or more sets of matching data sets for each reference data set from the plurality of sets of training data, wherein each matching data set has the same combination of primary and secondary channel identifiers as the respective reference data set; identifying one or more sets of non-matching data sets for each reference data set from the plurality of sets of training data, wherein each non-matching data set has a different combination of primary and secondary channel identifier to the respective reference data set; and training trainable parameters of an algorithm by minimising a loss function until, for all sets of matching data, outputs of the algorithm in response to the matching data set are closer to an output of the algorithm in response to the corresponding reference data set than to an output of the algorithm in response to any other reference data set.

In an eleventh aspect, this specification describes an apparatus comprising: at least one processor; and at least one memory including computer program code which, when executed by the at least one processor, causes the apparatus to: obtain first channel measurement data for a primary component carrier used for communications between a device and a network node of a mobile communication system; provide the first channel measurement data as an input to an algorithm to obtain a first embedding output; compare the first embedding output with embedding outputs of a plurality of reference channel measurement data input to said algorithm to identify a closest reference channel measurement data to the first channel measurement data; identify a set of reference channel information associated with the identified closest reference channel measurement data, wherein the identified set of reference channel information comprises a carrier aggregation policy defining one or more secondary communication channels; and set a carrier aggregation policy for the primary component carrier in accordance with the carrier aggregation policy of the identified set of reference channel measurement data.

In a twelfth aspect, this specification describes an apparatus comprising: at least one processor; and at least one memory including computer program code which, when executed by the at least one processor, causes the apparatus to: obtain a plurality of sets of training data, wherein each set of the plurality of training data comprises: first channel measurement data for a primary component carrier used for communications between a device and a network node of a mobile communication system; a primary channel identifier for said primary component carrier; and an ordered list of secondary channel identifiers for secondary component carriers for communications between the device and the network node; identify one or more sets of reference data from the plurality of sets of training data, wherein each reference data set has a different combination of primary and secondary channel identifiers to all other sets of reference data; identify one or more sets of matching data sets for each reference data set from the plurality of sets of training data, wherein each matching data set has the same combination of primary and secondary channel identifiers as the respective reference data set; identify one or more sets of non-matching data sets for each reference data set from the plurality of sets of training data, wherein each non-matching data set has a different combination of primary and secondary channel identifier to the respective reference data set; and train trainable parameters of an algorithm by minimising a loss function until, for all sets of matching data, outputs of the algorithm in response to the matching data set are closer to an output of the algorithm in response to the corresponding reference data set than to an output of the algorithm in response to any other reference data set.

In a thirteenth aspect, this specification describes an apparatus comprising: a first measurement module (or some other means) for obtaining first channel measurement data for a primary component carrier used for communications between a device and a network node of a mobile communication system; a first output (or some other means) for providing the first channel measurement data as an input to an algorithm to obtain a first embedding output; a comparator (or some other means) for comparing the first embedding output with embedding outputs of a plurality of reference channel measurement data input to said algorithm to identify a closest reference channel measurement data to the first channel measurement data; a clustering module (or some other means) for identifying a set of reference channel information associated with the identified closest reference channel measurement data, wherein the identified set of reference channel information comprises a carrier aggregation policy defining one or more secondary communication channels; and an output module (or some other means) for setting a carrier aggregation policy for the primary component carrier for communications between the device and the network node of the mobile communication system in accordance with the carrier aggregation policy of the identified set of reference channel measurement data.

In a fourteenth aspect, this specification describes an apparatus comprising: an input module (or some other means) for obtaining a plurality of sets of training data, wherein each set of the plurality of training data comprises: first channel measurement data for a primary component carrier used for communications between a device and a network node of a mobile communication system; a primary channel identifier for said primary component carrier; and an ordered list of secondary channel identifiers for secondary component carriers for communications between the device and the network node; a first processor (or some other means) for: identifying one or more sets of reference data from the plurality of sets of training data, wherein each reference data set has a different combination of primary and secondary channel identifiers to all other sets of reference data; for identifying one or more sets of matching data sets for each reference data set from the plurality of sets of training data, wherein each matching data set has the same combination of primary and secondary channel identifiers as the respective reference data set; and for identifying one or more sets of non-matching data sets for each reference data set from the plurality of sets of training data, wherein each non-matching data set has a different combination of primary and secondary channel identifiers to the respective reference data set; a machine learning module (or some other means) for training trainable parameters of an algorithm by minimising a loss function until, for all sets of matching data, outputs of the algorithm in response to the matching data set are closer to an output of the algorithm in response to the corresponding reference data set than to an output of the algorithm in response to any other reference data set.

The embodiments according to the present disclosure improve the overall data throughput for device, such as a User Equipment, UE. Since there is a higher probability of selecting the optimal secondary carrier component(s), CC(s), the UE will need less CCs to achieve the target throughput due to the higher bit rate on the optimally selected CC(s). This increases the battery life of the UE as well. Furthermore, latency is expected to be reduced since the selection of secondary CC(s) does not require any additional measurements from secondary CC(s).

BRIEF DESCRIPTION OF THE DRAWINGS

Example embodiments will now be described, by way of example only, with reference to the following schematic drawings, in which.

DETAILED DESCRIPTION

The scope of protection sought for various embodiments of the invention is set out by the independent claims. The embodiments and features, if any, described in the specification that do not fall under the scope of the independent claims are to be interpreted as examples useful for understanding various embodiments of the invention.

In the description and drawings, like reference numerals refer to like elements throughout.

Figure 1:
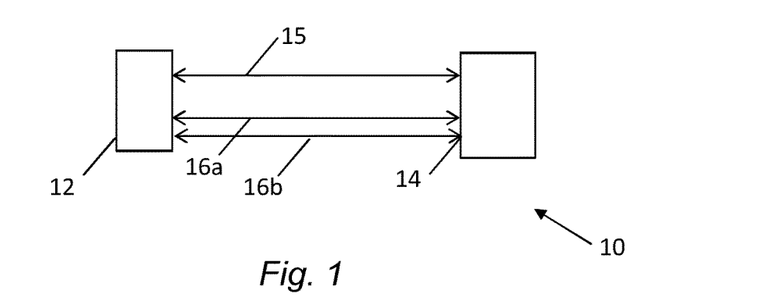
FIG. 1 is a block diagram of a system in accordance with an example embodiment.

FIG. 1 is a block diagram of a system, indicated generally by the reference numeral 10, in accordance with an example embodiment.

The system 10 comprises a user device 12 (such as mobile communication device or user equipment) and a communication node 14 (such as a base station). The user device 12 has one primary component carrier (PCC) 15. In addition, the user device 12 has one or more secondary component carriers (SCCs) both in the uplink (UL) and the downlink (DL) directions. Two secondary component carriers 16a and 10 are shown in FIG. 1 by way of example.

Carrier aggregation (CA) can be useful in mobile communication systems where a high bit rate communication can be achieved by aggregating multiple component carriers (CCs) at different centre frequencies and by transmitting simultaneously both in the downlink (DL) and the uplink (UL) on aggregated CCs. The system 10 implements a multiple component carriers-based mobile communication system which may be suitable for use, for example, with 4G/LTE and 5G technologies.

Different user devices may have different carriers as their primary component carrier. The process of adding secondary component carrier(s) is known as CA configuration, which may be handled at the radio resource control (RRC) layer of the 3GPP protocol stack. Configured secondary component carrier(s) can be either in active or inactive state, and CA activation may be handled at the medium access control (MAC) layer of the 3GPP-protocol stack.

In some example embodiments, the base station 14 may have a set of component carriers (CCs) configured for each of a plurality of user devices (including the user device 12) in communication with the base station. Thus, when the base station 14 decides to send traffic on any of secondary CC(s) already configured for a given user device, that CC should be in a "CA active" state. CA active state means that the relevant user device scans the PDCCH ((Physical Downlink Control Channel) for any DL/UL grant. It should also be noted here that the more bandwidth (more CCs(s)) a user device needs to scan, the less optimized its battery utilization will be.

Figure 2:
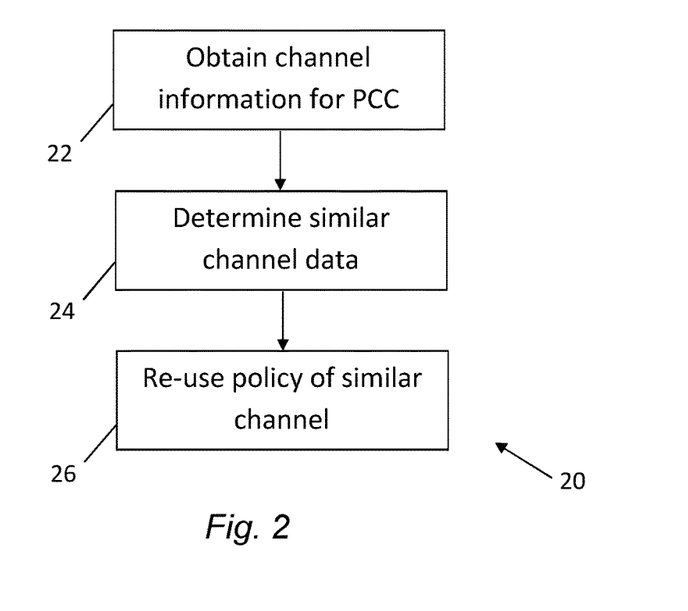
FIG. 2 is a flowchart showing an algorithm in accordance with an example embodiment.

FIG. 2 is a flowchart showing an algorithm, indicated generally by the reference numeral 20, in accordance with an example embodiment. The algorithm 20 can be used for determining a secondary component carrier configuration, for example of the user device 12.

The algorithm 20 starts at operation 22 where channel information, such as channel state information, for the primary component carrier for communications between a user device and a communication node are obtained (e.g. measured). The channel information may, for example, relate to the primary component carrier (PCC) 15 of the system 10 described above.

At operation 24, one or more similar channels are determined based on the channel information (e.g. channel state information) for the primary component carrier, as obtained in the operation 22. By way of example, channel state information for the primary component carrier may contain information relating to the channel that can be used for identifying other channels that are similar, according to some metric (as discussed in detail below).

At operation 26, a secondary component carrier configuration or policy for an identified similar channel is used for the secondary component carrier configuration or policy of the channel. Adopting the secondary component carrier configuration or policy of a "similar" channel may result in better performance than selecting second component carriers randomly or arbitrarily.

As described in detail below, the operation 24 in which one or more similar channels are identified may be implemented using machine learning algorithms.

Figure 3:
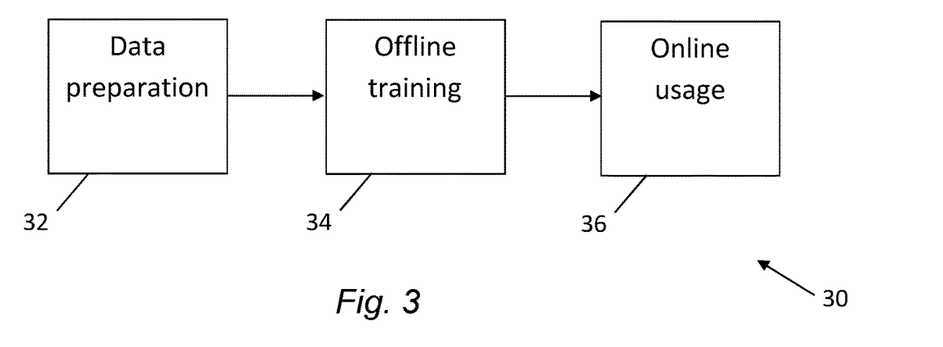
FIG. 3 is a block diagram of a system in accordance with an example embodiment.

FIG. 3 is a block diagram of a system, indicated generally by the reference numeral 30, in accordance with an example embodiment. The system 30 comprises a data preparation module 32, an offline training module 34 and an online usage module 36. Once trained, the online usage module 36 may be used to implement the algorithm 20 described above.

The data preparation module 32 makes use of data for known samples for which the example (e.g. optimal) secondary component carrier (CCs) for identified primary component carriers are known and recorded (for the purpose of training). The data may be collated in a database by measuring the channel quality (or some other channel state metric) on each of a plurality of secondary CCs and choosing the optimal CCs for activation. Each sample in the database may include identifiers (IDs) of the primary and secondary activated component carriers, together with radio measurements for the primary channel (PCC). Such radio measurements may, for example, correspond to channel quality measurements (e.g. CQI) either in downlink (which requires reporting from the user device/UE) or the channel estimates in the uplink (measured directly by the base station/gNB).

The offline training module 34 seeks to make use of machine learning (ML) to infer a hidden relationship between (1) the channel information (e.g. channel quality) on a particular primary component carrier and (2) the channel qualities on the secondary component carriers that are activated for the respective primary component carrier, both of which are determined from the data collated in operation 32. The ML model is trained to learn an embedding for each sample of the database. Such "embeddings" are lower dimensional representations of the radio measurements that seek to capture the essential features of the radio measurements that are crucial in identifying the unknown relationship between the channel information (e.g. quality) on the primary CC and the secondary CCs. They are called embeddings because mathematical operations can be performed on them.

Once the ML model has been trained (using the offline training module 34), the embeddings of certain samples from the training set (referred to below as "masters" or "anchors") are stored in a database which is subsequently used for the similarity measure by the online usage module 36.

The online usage module 36 may implement operations executed in real time in order to provide a list of secondary component carriers (CCs) to be activated based on PCC channel quality measurements (available on either the DL or the UL). For a given user device (such as the user device 12 described above), the online usage module 36 may use the ML model to generate an embedding based on PCC channel measurement data. The anchor/master in the database whose embedding is closest to that of the given user device may be identified (thereby implementing the operation 24 of the algorithm 20), and the user device assigned to the cluster belonging to that anchor/master. Subsequently, the secondary CCs of the anchor may be retrieved and activated for that user device, as discussed in detail below (thereby implementing operation 26 of the algorithm 20).

Figure 4:
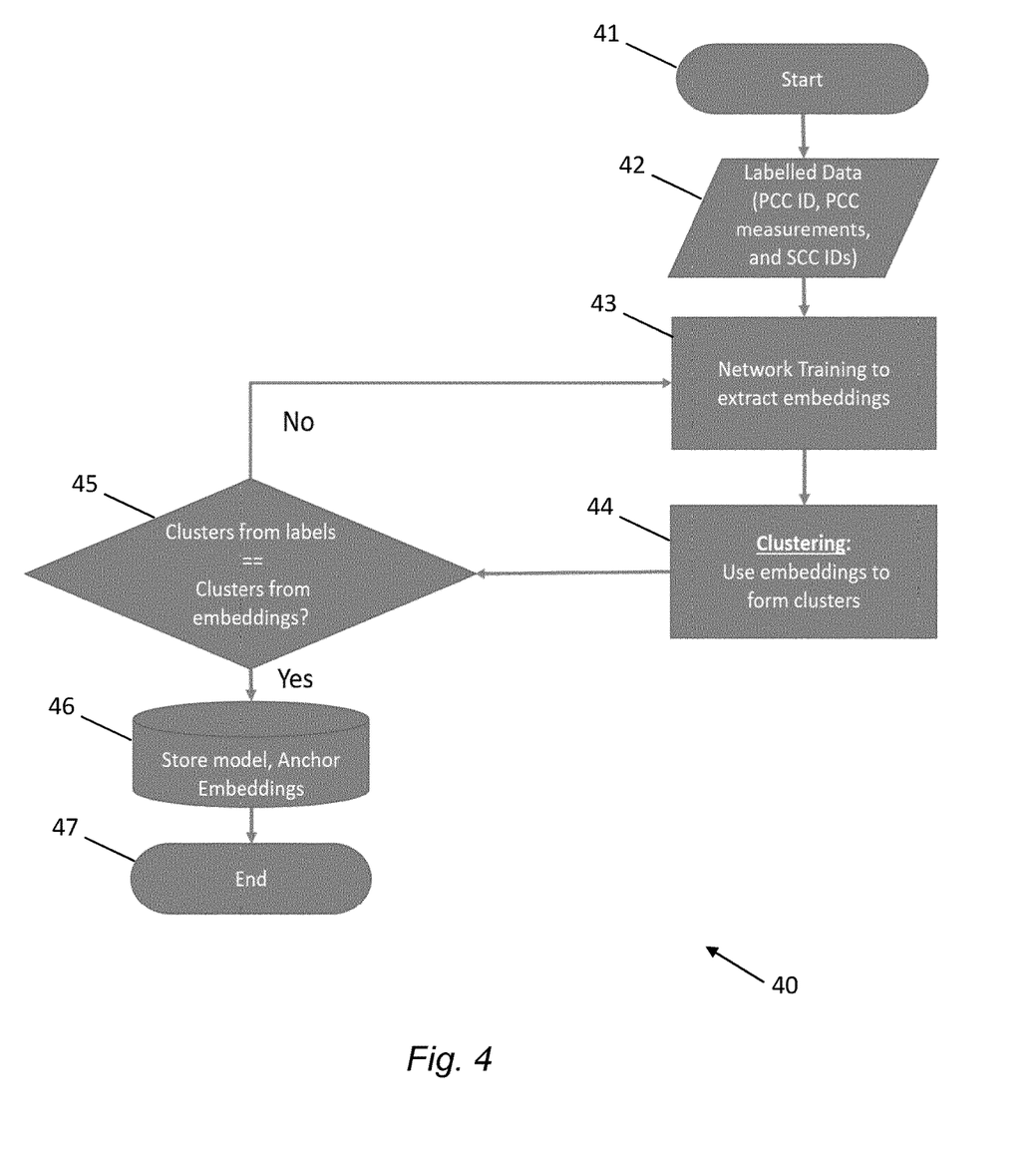
FIGS. 4 to 7 are flowcharts showing algorithms in accordance with example embodiments.

FIG. 4 is a flowchart showing an algorithm, indicated generally by the reference numeral 40, in accordance with an example embodiment. The algorithm 40 starts at operation 41 and then moves to operation 42.

At operation 42, labelled data is collated. The operation 42 may be implemented by the data preparation module 32.

Each element of the labelled data collated in operation 42 includes: the identifier of a primary component carrier (PCC ID), measured radio conditions of the primary component carrier (PCC measurements, such as channel quality information, channel state information or similar data) and identifiers of the secondary component carriers (SCC IDs, e.g $SCC_1$, $SCC_2$, . . . , $SCC_m$) associated with the primary component carrier. Thus there may be m configured secondary CCs for every user, which listed may be ordered (e.g. the order of the list may determine the order of activation of the secondary CCs).

At operation 43, the ML model is trained based on the labelled data. The training of the ML model may be implemented by the offline training module 34. The ML model is trained by minimising a loss function, as discussed in detail below.

At operation 43, the ML model is used to extract embeddings from the PCC measurements for the labelled data. For example, the operation 43 may be implemented by providing channel measurement data of each of a plurality of identified matching data sets (i.e. obtained from the labelled data collated in the operation 42) as an input to the ML algorithm to obtain a plurality of matching embedding outputs The embeddings extracted in operation 43 are clustered in operation 44. For example, the clustering operation may involve determining, for each of the embedding outputs, which of a plurality of reference data sets is closest to said embedding output.

At operation 45, the clustering determined from the labelled data is compared with the clustering of operation 44. For example, the operation 45 may be implemented by determining whether each of the plurality of matching embedding outputs is closer to an embedding output of the corresponding reference data set than to an embedding output of any other reference data set and, if so, determining that the algorithm is validated.

If the clusterings are equivalent, then the ML model is deemed to be trained and the algorithm moves to operation 46. Otherwise, the algorithm returns to operation 43 and the ML model is further trained. Thus, the operation 45 of the algorithm determines whether training of the trainable parameters of the ML model is validated and the training of said trainable parameters is repeated in the event that said training is not validated.

At operation 46 of the algorithm 40, the training of the model is deemed to be complete. The algorithm (e.g. in the form of trainable parameters of the ML model) may be stored at this stage, together with other data, such as anchor embedding/sets of reference data and sets of embedding outputs generated by applying channel measurement data of said reference data to the algorithm.

The algorithm 40 then terminates at operation 47.

Figure 5:
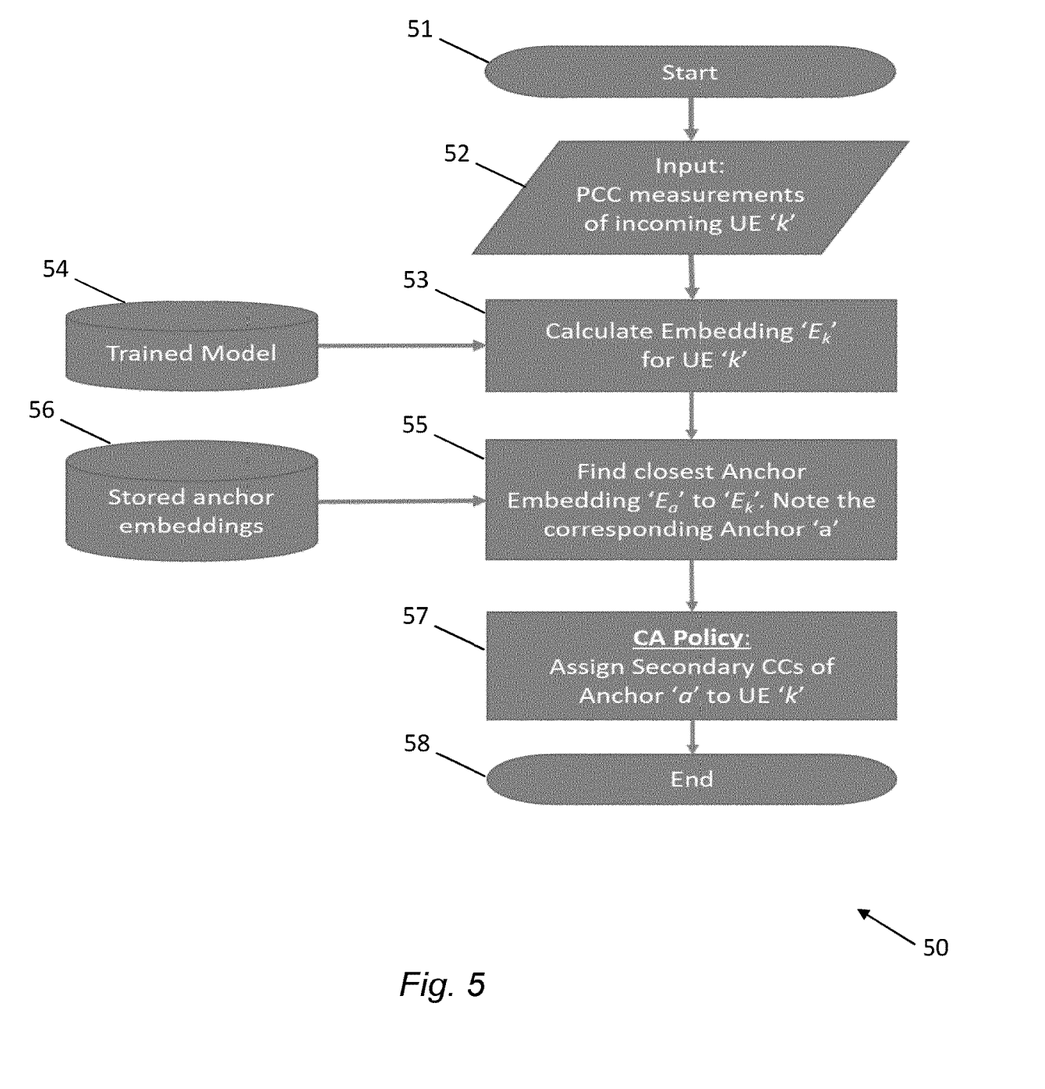

FIG. 5 is a flowchart showing an algorithm, indicated generally by the reference numeral 50, in accordance with an example embodiment. The algorithm 50 may be implemented using the online usage module 36 described above.

The algorithm 50 starts at operation 51 and then moves to operation 52.

At operation 52, first channel measurement data is obtained (e.g. retrieved or received) for a primary component carrier (PCC) of a mobile communication system used for communications between a device (such as the user device 12) and a network node (such as the base station 14). The first channel measurement data may comprise channel quality information, channel state information or similar data.

At operation 53, the first channel measurement data obtained in the operation 52 are provided as an input to an algorithm to obtain a first embedding output. The algorithm is a stored trained model 54 (e.g. the ML model stored in the operation 46 of the algorithm 40 described above).

At operation 55, the first embedding output generated in operation 53 is compared with embedding outputs of a plurality of reference channel measurement data (e.g. "anchor" embeddings) to identify a closest reference channel measurement data to the first component carrier data. The reference/anchor embeddings are retrieved from a store (e.g. a database) 56 and may be those stored in the operation 46 of the algorithm 40 described above.

At operation 57, carrier aggregation policy of the reference channel identified in the operation 55 is used to assign secondary component carriers for communications between the device and the network node. The algorithm 50 then terminates at operation 58.

Figure 6:
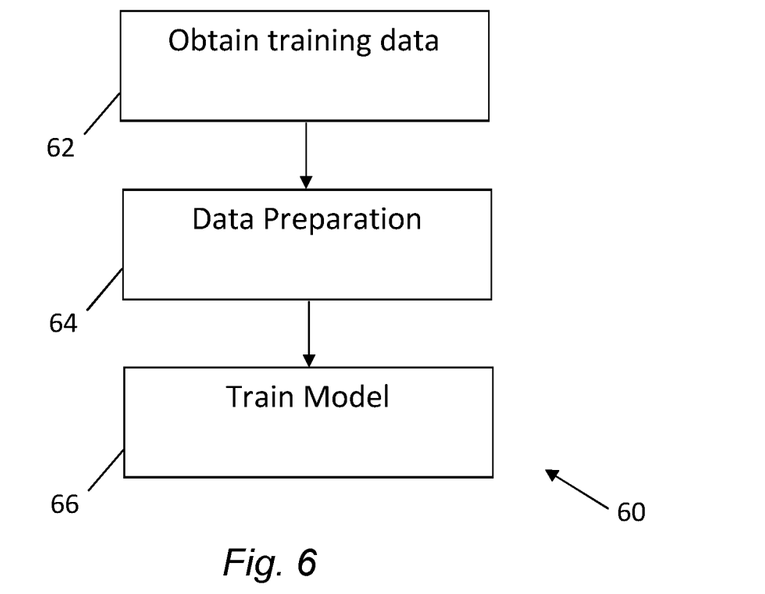

FIG. 6 is a flowchart showing an algorithm, indicated generally by the reference numeral 60, in accordance with an example embodiment.

The algorithm 60 starts at operation 62, where a plurality training data is obtained (e.g. received, generated or otherwise obtained).

The set of training data obtained in the operation 62 may be denoted as $\mathcal{T}$. Every data sample in the data set $\mathcal{T}$ may be a CSI vector $X_{CSI}$, which vector is the measured radio channel conditions on the PCC of a user device.

Associated with each $X_{CSI}$ is the tuple (PCC($X_{CSI}$), $SCC_1$ ($X_{CSI}$), ..., $SCC_m$ ($X_{CSI}$)), where PCC($X_{CSI}$) is the identifier (ID) of the primary component carrier, $SCC_i(X_{CSI})$ is the ID of the ith configured secondary component carrier for that user device. We assume here that there are m configured secondary component carriers for every user and that the list is ordered, i.e., the order of the list determines the order of activation of the secondary component carriers (although it should be noted that it is not essential to all example embodiments for the list to be ordered). For convenience, we denote the tuple (PCC($X_{CSI}$), $SCC_1$(XX$_{CSI}$), . . . , $SCC_m$ ($X_{CSI}$)) by CC($X_{CSI}$).

At operation 64, the data obtained in the operation $6_4$ is prepared (for use in the training of the ML model). The data may be prepared by the data preparation module 32 described above.

At operation 66 of the algorithm 60, the ML model is trained using the data as prepared in the operation 64. Trainable parameters of the ML algorithm are trained by minimising a loss function until, for all sets of matching data, outputs of the algorithm in response to the matching data set are closer to an output of the algorithm in response to the corresponding reference data set than to an output of the algorithm in response to any other reference data set.

Figure 7:
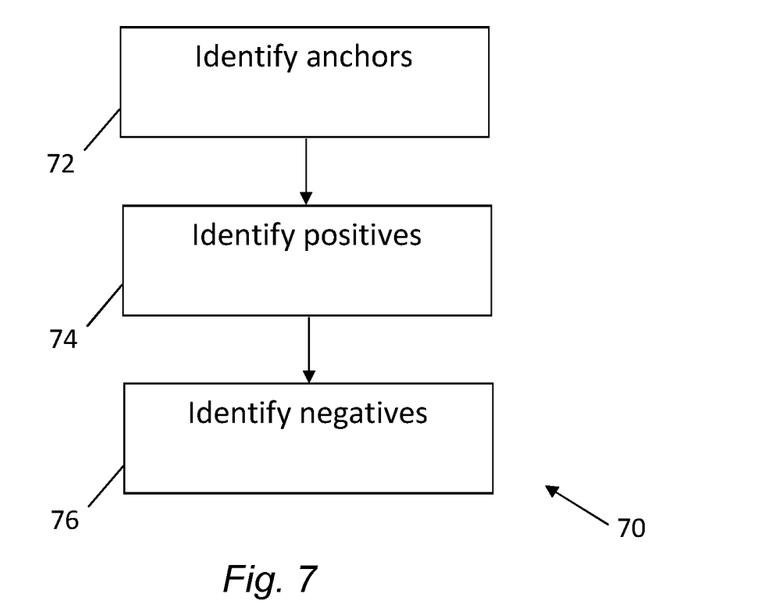

FIG. 7 is a flowchart showing an algorithm, indicated generally by the reference numeral 70, in accordance with an example embodiment. The algorithm 70 is an example implementation of the data preparation operation 64 (and may be implemented using the data preparation module 32 described above).

The algorithm 70 starts at operation 72, where one or more sets of reference data (or "anchor" data) are identified from the plurality of sets of training data obtained in the operation 62. Each reference data set has a different combination of primary and second channel identifiers to all other sets of reference data.

The set of reference data or anchors $\mathcal{A}$ may consist of all elements of the data set $\mathcal{T}$ with unique CC ID tuples. To be precise, $\forall X_{1,CSI}, X_{2,CSI} \in \mathcal{A}$, CC($X_{1,CSI}$)$\neq$CC($X_{2,CSI}$) if $X_{1,CSI} \neq X_{2,CSI}$. In other words, elements of $\mathcal{A}$ have unique combinations of the associated primary and secondary component carriers.

At operation 74, one or more sets of matching data sets (or "positives") are identified for each reference data set from the plurality of sets of training data. Each matching data set has the same combination of primary and secondary channel identifiers as the respective reference/anchor data set.

The matching data sets (or positives) may be defined as follows. For every $X_{CSI} \in \mathcal{A}$, a set of positives $\mathcal{P}(X_{CSI})=\{X_{1,CSI} \in \mathcal{T} \mid CC(X_{1,CSI})=CC(X_{CSI})\}$ is identified. In other words, the elements of $\mathcal{P}(X_{CSI})$ have the same CC tuple as that of $X_{CSI}$.

At operation 76, one or more sets of non-matching data sets (or "negatives") are identified for each reference data set from the training data. Each non-matching data set has a different combination of primary and second channel identifiers to the respective reference data set.

The non-matching data sets (or negatives) may be defined as follows. For every $X_{CSI} \in \mathcal{A}$, a set of negatives $\mathcal{N}(X_{CSI})=\{X_{1,CSI} \in \mathcal{T} \,\&\, X_{1,CSI} \notin \mathcal{P}(X_{CSI})\}$ is identified. In other words, the elements of $\mathcal{N}(X_{CSI})$ have CC tuples different from that of $X_{CSI}$.

The model trained in the operation 66 seeks to find the hidden relationship between the radio channel conditions of the primary component carrier and that of the associated secondary component carriers. (That is, the radio conditions on primary and secondary component carriers that have been activated together in the past for particular user devices.) For example, assume that PCC1 and SCC1 were activated for a user device. There may have been a relationship between the radio conditions on PCC1 and SCC1 that made SCC1 an optimal secondary carrier for activation. If PCC1 and SCC1 were adjacent bands, this relationship would be more apparent. But if they are not on adjacent bands, then it is hard to explicitly work out what this relationship could be. So, the neural network tries to find this relationship and represent it using a lower dimensional embedding. In other words, the neural network tries to find that information about the radio conditions on the PCC that made that particular SCC an optimal choice.

Figure 8:
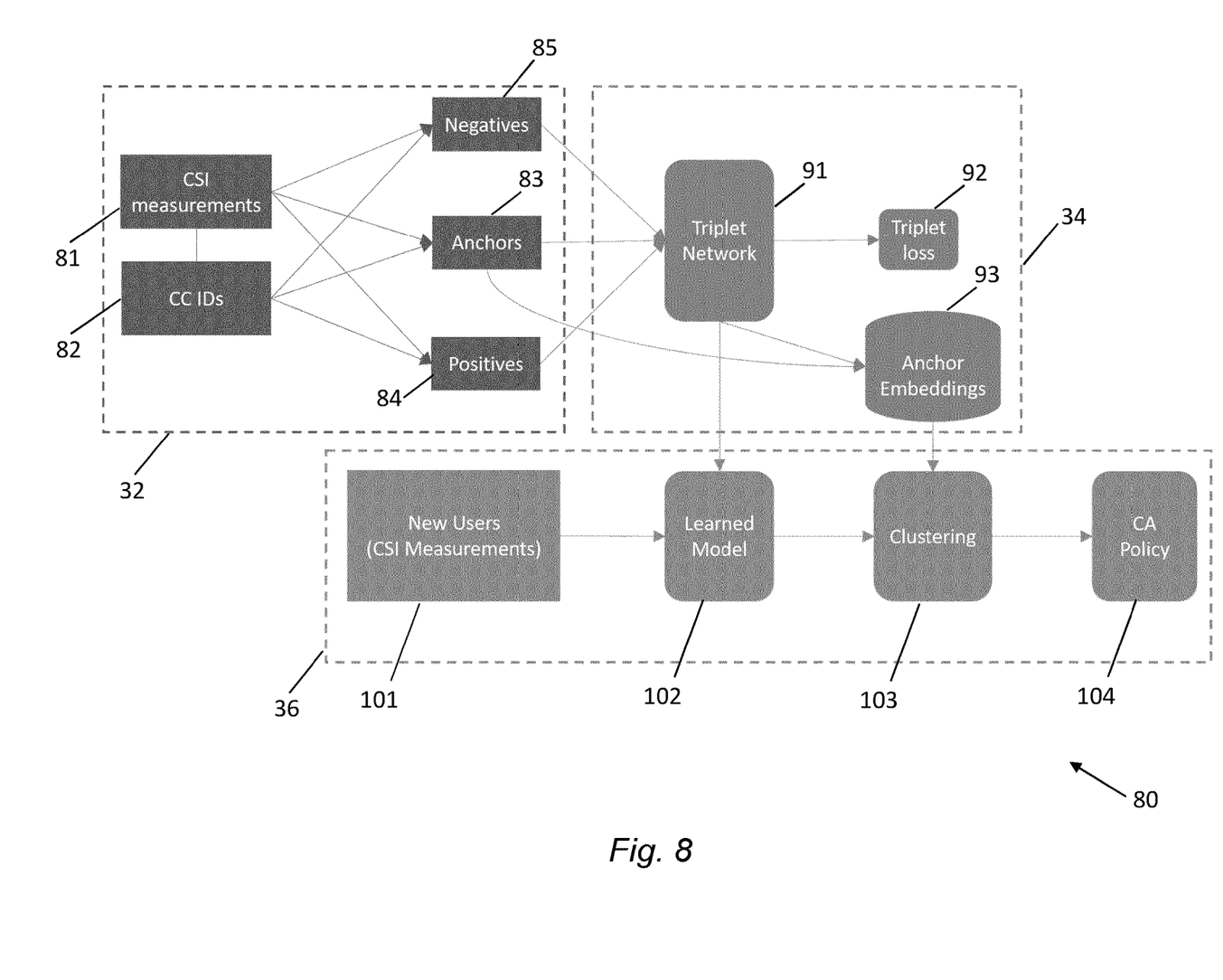
FIGS. 8 and 9 are block diagrams of systems in accordance with example embodiments.

FIG. 8 is a block diagram of a system, indicated generally by the reference numeral 80, in accordance with an example embodiment. The system 80 comprises the data preparation module 32, the offline training module 34 and the online usage module 36 of the system 30 described above. The system 80 can be used to implement the algorithms 40, 50, 60 and 70 described above.

The data preparation module 32 comprises a CSI measurements module 81, component carrier identifiers (CC IDs) module 82, anchors module 83, positives module 84 and negatives module 85.

The offline training module 34 comprises a triplet network 91, a triplet loss module 92 and anchor embeddings module 93.

The online usage module 36 comprises CSI measurement module 101, a ML model 102, a cluster module 103 and a carrier aggregation (CA) policy module 104.

As described above, the algorithm 60 starts at operation 62, where a plurality of training data is obtained. The set of training data obtained in the operation 62 may be denoted as $\mathcal{T}$. Every data sample in the data set $\mathcal{P}$ may be a CSI vector $X_{CSI}$, which vector is the measured radio channel conditions on the PCC of a user device. That data may be stored in the CSI measurements module 81. Component carrier identifiers associated with the CSI measurements may be stored in the CC IDs module 82.

At operation 64 of the algorithm 60, the training data is organised, for example into anchors, positives and negatives. The training data may, for example, be organised by storing the anchor data in the anchors module 83, storing the positives data in the positives module 84 and storing the negatives data in the negatives module 85.

For every sample in the training set $X_{CSI} \in \mathcal{A}$, triplets are formed $(X_{CSI}, p(X_{CSI}), n(X_{CSI}))$ where $p(X_{CSI}) \in \mathcal{P}(X_{CSI})$ and $n(X_{CSI}) \in \mathcal{N}(X_{CSI})$. The triplet network 91 receives each element of the triplet from the anchors module 83, positives module 84 and negatives module 85.

The triplet network 91 is trained using the triplet loss function module 92, which triplet loss function is given by:

$$L(A, P, N) = \sum_{\substack{X_{CSI} \in \mathcal{A}, p(X_{CSI}) \in \mathcal{P}(X_{CSI}), \\ n(X_{CSI}) \in \mathcal{N}(X_{CSI})}} \max\{\|E(X_{CSI}) - E(p(X_{CSI}))\|^2 - \|E(X_{CSI}) - E(n(X_{CSI}))\|^2 + \alpha, 0\}.$$

Here $\alpha > 0$ is a hyperparameter that is finetuned during training.

The output of the neural network is an embedding for $X_{CSI}$, denoted by $E(X_{CSI})$.

The set of embeddings of all the anchors, given by $\varepsilon = \{E(X_{CSI}) | X_{CSI} \in \mathcal{A}\}$, is stored in a database (e.g. the anchor embeddings module 93).

As described above, at operation 52 of the algorithm 50, first channel measurement is data is obtained for a primary component carrier (PCC) of a mobile communication.

That operation may be implemented using the CSI measurement module 101 of the online usage module, which module may output a CSI measurement denoted by $Z_{CSI}$.

Next, the embedding $E(Z_{CSI})$ is obtained using the learned model 102.

The cluster module 103 may be used to assign the cluster of the anchor that it is closest to as follows:

$$C(Z_{CSI}) = \arg\min_{X_{CSI} \in \mathcal{A}} \{\|E(X_{CSI}) - E(Z_{CSI})\|^2\}.$$

The user may be assigned the same CA policy as that of Anchor $C(Z_{CSI})$ by the CA policy module 104.

Figure 9:
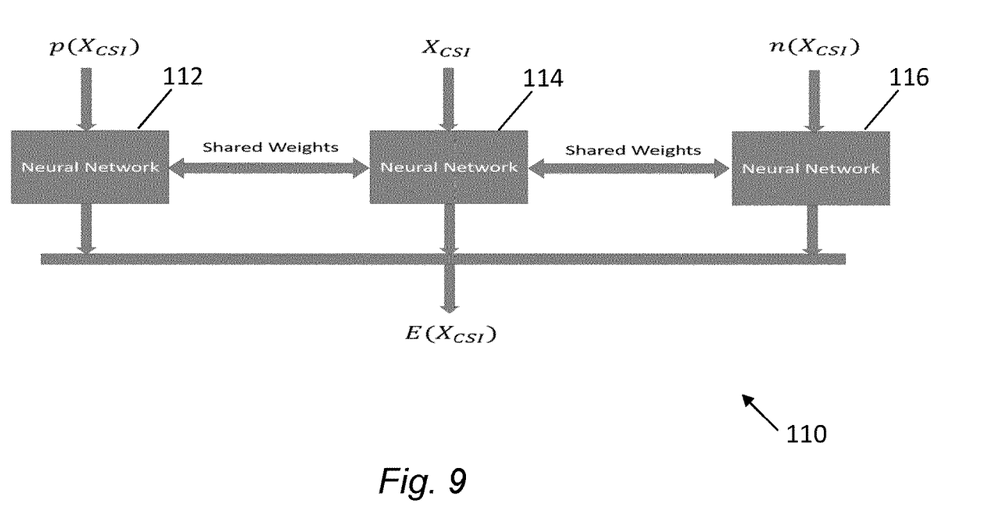

FIG. 9 is a block diagram of a system, indicated generally by the reference numeral 110, in accordance with an example embodiment. The system 110 may be used as part of the triplet network 91 discussed above.

The system 110 includes three instances of the neural network implementing the trained model 102. Thus, the system 110 comprises a first neural network 112, a second neural network 114 and a third neural network 116. Those neural networks have shared weights, which is shown schematically in the system 110. (Of course, the functionality of the system no could be implemented without requiring three separate instances of the neural network; for example, a single neural network could be used.)

As discussed above, for every sample in the training set $X_{CSI} \in \mathcal{A}$, triplets are formed $(X_{CSI}, p(X_{CSI}), n(X_{CSI}))$ where $p(X_{CSI}) \in \mathcal{P}(X_{CSI})$ and $n(X_{CSI}) \in \mathcal{N}(X_{CSI})$.

The first neural network 112 receives the matching/positive data $p(X_{CSI})$, the second neural network 114 receives the relevant reference/anchor data $X_{CSI}$, and the third neural network 116 receives the non-matching/negative data $n(X_{CSI})$ The output of the second neural network 114 provides the embedding output for $X_{CSI}$, denoted by $E(X_{CSI})$. The system no can be used for comparing the outputs of the neural network for the reference/anchor data, the positives and the negatives, as part of the training algorithm described in detail above.

Figure 10:
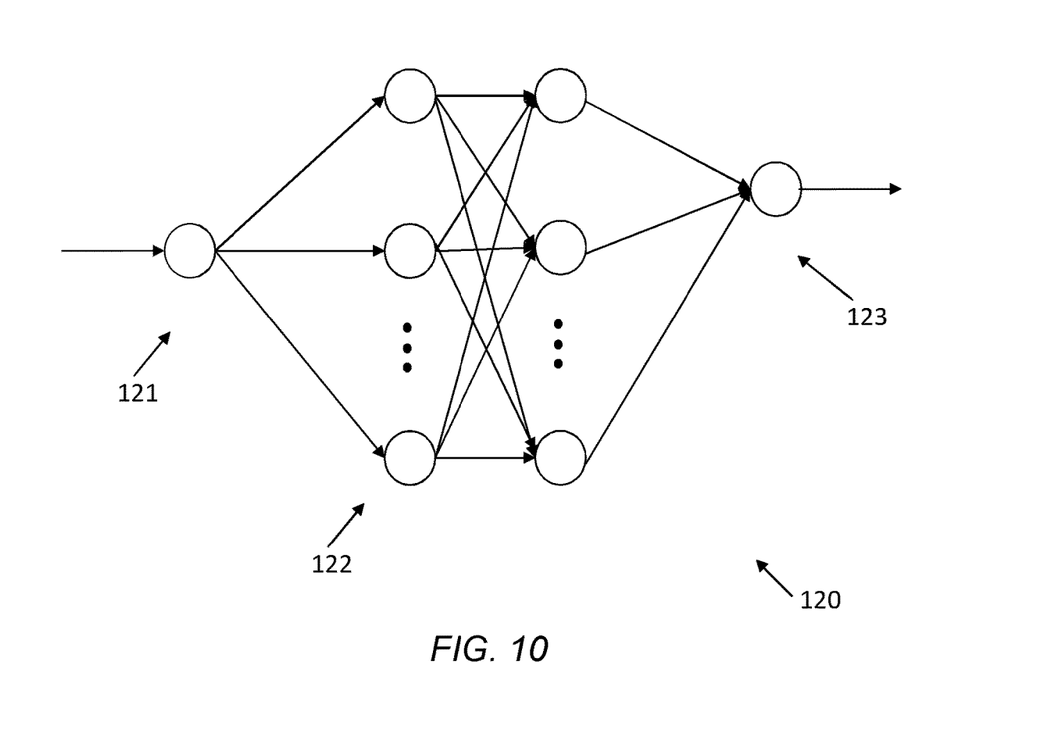
FIG. 10 is a block diagram of a neural network that may be used in some example embodiments.

FIG. 10 is a block diagram, of a neural network, indicated generally by the reference numeral 120, that may be used in some example embodiments. For example, the model described above may be a machine learning model that may be implemented using a neural network, such as the neural networks 112, 114 and 116.

The neural network 120 comprises an input layer 121, one or more hidden layers 122, and an output layer 123. During the usage of the neural network 120, at the input layer 121, input such as channel state data may be received. The hidden layers 122 may comprise a plurality of hidden nodes, where the processing may be performed based on the received inputs (e.g. channel state data). At the output layer 123, one or more outputs (e.g. embedding data) relating to the input may be provided.

The neural network 120 may be trained with inputs, including the labelled data described above (see, for example, the labelled data of the operation 42 of the algorithm 40). The training may be performed at the base station 14 or elsewhere (such as at a server).

By training a deep neural network using the triplet neural network architecture, it is possible to learn the hidden relationship between the CSI/CQI of the primary CC and the radio conditions on the secondary CCs. The methodology of using a triplet neural network with the triplet loss function can enable the network to learn embeddings that are useful in grouping user devices in some way (e.g. group user devices with similar characteristics together). Thus, user device with compatible channel conditions on the primary and secondary CCs can be clustered together.

Figure 11:
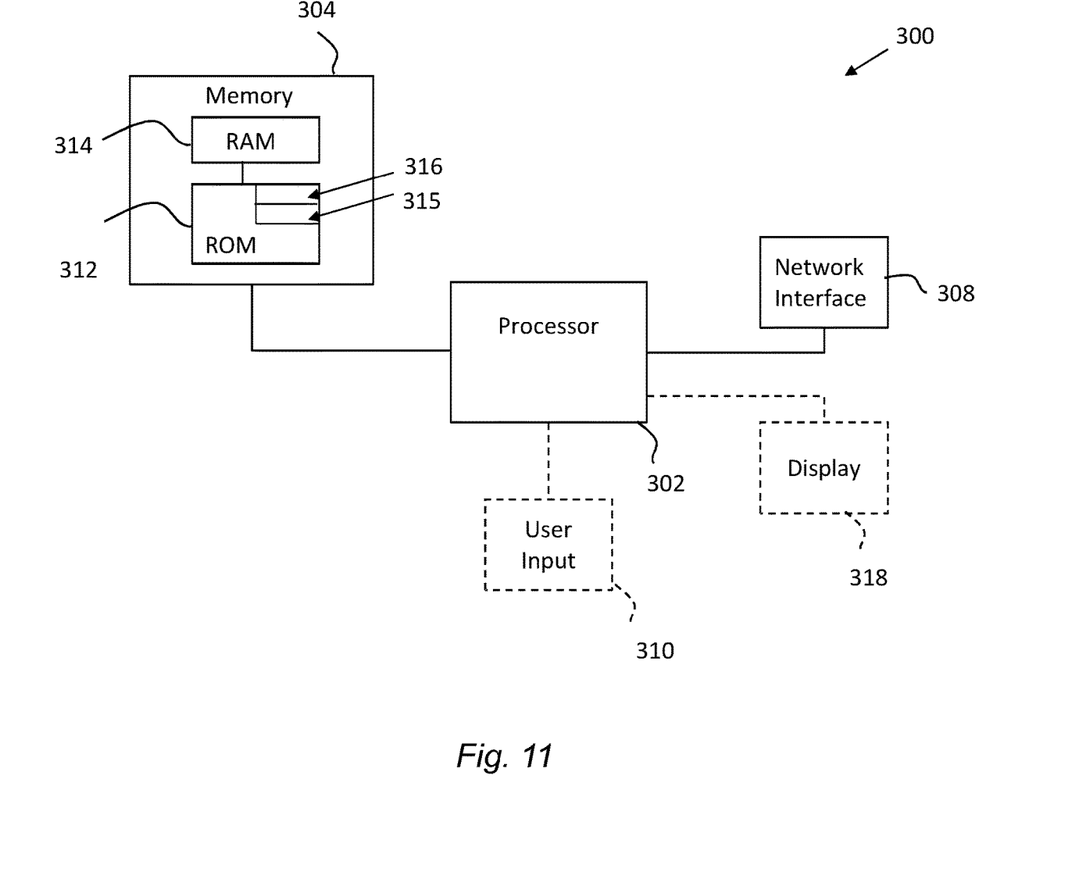
FIG. 11 is a block diagram of components of a system in accordance with an example embodiment.

For completeness, FIG. 11 is a schematic diagram of components of one or more of the example embodiments described previously, which hereafter are referred to generically as a processing system 300. The processing system 300 may, for example, be the apparatus referred to in the claims below.

The processing system 300 may comprise one or more of: a processor 302, a memory 304 closely coupled to the processor and comprised of a RAM 314 and a ROM 312, a user input 310 (such as a touch screen input, hardware keys and/or a voice input mechanism) and a display 318 (at least some of those components may be omitted in some example embodiments). The processing system 300 may comprise one or more network/apparatus interfacesd 308 for connection to a network/apparatus, e.g. a modem which may be wired or wireless. The interface 308 may also operate as a connection to other apparatus such as device/apparatus which is not network side apparatus. Thus, direct connection between devices/apparatus without network participation is possible.

The processor 302 is connected to each of the other components in order to control operation thereof.

The memory 304 may comprise a non-volatile memory, such as a hard disk drive (HDD) or a solid state drive (SSD). The ROM 312 of the memory 304 stores, amongst other things, an operating system 315 and may store software applications 316. The RAM 314 of the memory 304 is used by the processor 302 for the temporary storage of data. The operating system 315 may contain code which, when executed by the processor implements aspects of the algorithms 20, 40, 50, 60 and 70 described above. Note that in the case of small device/apparatus the memory can be most suitable for small size usage i.e. not always a hard disk drive (HDD) or a solid state drive (SSD) is used. The memory 304 may include computer program code, such that the at least one memory 304 and the computer program may be configured, with the at least one processor 302, may cause the performance of the apparatus.

The processor 302 may take any suitable form. For instance, it may be a microcontroller, a plurality of microcontrollers, a processor, or a plurality of processors.

The processing system 300 may be a standalone computer, a server, a console, or a network thereof. The processing system 300 and needed structural parts may be all inside device/apparatus such as IoT device/apparatus i.e. embedded to very small size.

In some example embodiments, the processing system 300 may also be associated with external software applications. These may be applications stored on a remote server device/apparatus and may run partly or exclusively on the remote server device/apparatus. These applications may be termed cloud-hosted applications. The processing system 300 may be in communication with the remote server device/apparatus in order to utilize the software application stored there.

Figure 12A:
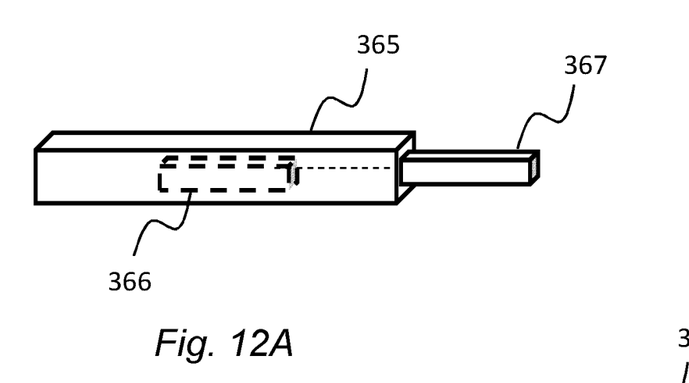
FIGS. 12A and 12B show tangible media, respectively a removable non-volatile memory unit and a Compact Disc (CD) storing computer-readable code which when run by a computer perform operations according to example embodiments.
Figure 12B:
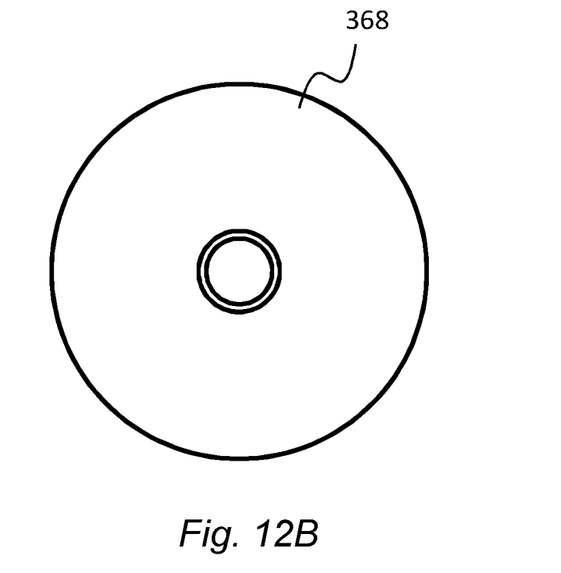

FIGS. 12A and 12B show tangible media, respectively a removable memory unit 365 and a compact disc (CD) 368, storing computer-readable code which when run by a computer may perform methods according to example embodiments described above. The removable memory unit 365 may be a memory stick, e.g. a USB memory stick, having internal memory 366 storing the computer-readable code. The internal memory 366 may be accessed by a computer system via a connector 367. The CD 368 may be a CD-ROM or a DVD or similar. Other forms of tangible storage media may be used. Tangible media can be any device/apparatus capable of storing data/information which data/information can be exchanged between devices/apparatus/network.

Embodiments of the present disclosure allow finding the hidden relationship between the radio conditions of different CCs. By finding suitable representations for the radio conditions of CCs, similar users (similarity is based on the closeness of the representations in Euclidean space) are clustered together. Each cluster has a Master UE with a known optimal carrier aggregation, CA, policy with a certain number of active CCs. All the UEs in a given clusters will follow the carrier aggregation policy of the Master UE of that cluster. Since this invention targets the selection of secondary CCs to be activated on a given UE optimally without any additional radio measurements from secondary CCs, both UE and cell throughput can be maximized, while at the same time reducing latency (since no additional measurements are required). UE battery life will also be improved since the target throughput is expected to be achieved using minimal number of CC(s).

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, "computer-readable medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices/apparatus and other devices/apparatus. References to computer program, instructions, code etc. should be understood to express software for a programmable processor firmware such as the programmable content of a hardware device/apparatus as instructions for a processor or configured or configuration settings for a fixed function device/apparatus, gate array, programmable logic device/apparatus, etc.

If desired, the different functions discussed herein may be performed in a different order and/or concurrently with each other. Furthermore, if desired, one or more of the above-described functions may be optional or may be combined. Similarly, it will also be appreciated that the flow diagrams of FIGS. 2 and 4 to 7 are examples only and that various operations depicted therein may be omitted, reordered and/or combined.

It will be appreciated that the above described example embodiments are purely illustrative and are not limiting on the scope of the invention. Other variations and modifications will be apparent to persons skilled in the art upon reading the present specification.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

Although various aspects of the invention are set out in the independent claims, other aspects of the invention comprise other combinations of features from the described example embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. An apparatus comprising:
   at least one processor; and
   at least one memory storing instructions that, when executed by the at least one processor, cause the apparatus to perform at least the following:
   obtaining first channel measurement data for a primary component carrier used for communications between a device and a network node of a mobile communication system;
   providing the first channel measurement data as an input to an algorithm to obtain a first embedding output;
   comparing the first embedding output with embedding outputs of a plurality of reference channel measurement data input to said algorithm to identify a closest reference channel measurement data to the first channel measurement data;
   identifying a set of reference channel information associated with the identified closest reference channel measurement data, wherein the identified set of reference channel information comprises a carrier aggregation policy defining one or more secondary communication channels; and
   setting a carrier aggregation policy for the primary component carrier for communications between the device and the network node of the mobile communication system in accordance with the carrier aggregation policy of the identified set of reference channel information, wherein the one or more secondary communication channels of the carrier aggregation policy of the identified set of reference channel information are arranged in an ordered list.

2. The apparatus as claimed in claim 1, wherein the at least one memory stores instructions that, when executed by the at least one processor, cause the apparatus to perform at least the following:
   identifying the closest reference channel measurement data with identifying the reference channel measurement data of the plurality with an embedding output that is closest to the first embedding output.

3. The apparatus as claimed in claim 1, wherein the algorithm is implemented using a triplet network having a plurality of parameters that are trainable using a triplet loss function.

4. The apparatus as claimed in claim 1, wherein each embedding output obtained from the algorithm is a lower dimensional representation of the first channel measurement data of a respective primary component carrier.

5. An apparatus comprising:
   at least one processor; and
   at least one memory storing instructions that, when executed by at least one processor, cause the apparatus to perform at least the following:
   obtaining a plurality of sets of training data, wherein each set of the training data comprises: first channel measurement data for a primary component carrier used for communications between a device and a network node of a mobile communication system; a primary channel identifier for said primary component carrier; and an ordered list of secondary channel identifiers for secondary component carriers for communications between the device and the network node;
   identifying one or more sets of reference data from the plurality of sets of training data, wherein each reference data set has a different combination of primary and secondary channel identifiers to all other sets of reference data;
   identifying one or more sets of matching data sets for each reference data set from the plurality of sets of training data, wherein each matching data set has a same combination of primary and secondary channel identifiers as the respective reference data set;
   identifying one or more sets of non-matching data sets for each reference data set from the plurality of sets of training data, wherein each non-matching data set has a different combination of primary and secondary channel identifiers to the respective reference data set; and
   training trainable parameters of an algorithm with minimising a loss function until, for all sets of matching data, outputs of the algorithm in response to the matching data set are closer to an output of the algorithm in response to the corresponding reference data set than to an output of the algorithm in response to any other reference data set.

6. The apparatus as claimed in claim 5, wherein the loss function is a triplet loss function and wherein the algorithm is implemented using a triplet network having a plurality of parameters that are trainable using said triplet loss function.

7. The apparatus as claimed in claim 6, wherein the loss function is associated with a plurality of triplets to train the algorithm, wherein each triplet comprises:
   channel measurement data of a first reference data set of the one or more sets of reference data;
   channel measurement data of one of the matching data sets for the respective first reference data set; and
   channel measurement data of one of the non-matching data sets for the respective first reference data set.

8. The apparatus as claimed in claim 7, wherein the at least one memory stores instructions that, when executed by the at least one processor, cause the apparatus to perform at least the following:
   determining whether training of the trainable parameters of the triplet network is validated with:
   providing channel measurement data of each of a plurality of identified matching data sets as an input to the algorithm to obtain a plurality of matching embedding outputs; and
   determining whether each of the plurality of matching embedding outputs is closer to an embedding output of the corresponding reference data set than to an embedding output of any other reference data set and, if so, determining that the algorithm is validated.

9. The apparatus as claimed in claim 5, wherein the at least one memory stores instructions that, when executed by the at least one processor, cause the apparatus to perform one or more of the following:
   storing the algorithm;
   storing the one or more sets of reference data; or
   storing a set of embedding outputs, wherein each embedding output is generated with applying first channel measurement data for the primary component carrier of the respective reference data set to the algorithm.

10. The apparatus as claimed in claim 1, wherein the channel measurement data for each primary component carrier comprises at least one of: channel quality information, channel state information or other radio measurement data.

11. A method comprising:
   obtaining first channel measurement data for a primary component carrier used for communications between a device and a network node of a mobile communication system;
   providing the first channel measurement data as an input to an algorithm to obtain a first embedding output;
   comparing the first embedding output with embedding outputs of a plurality of reference channel measurement data input to said algorithm to identify a closest reference channel measurement data to the first channel measurement data;
   identifying a set of reference channel information associated with the identified closest reference channel measurement data, wherein the identified set of reference channel information comprises a carrier aggregation policy defining one or more secondary communication channels; and
   setting a carrier aggregation policy for the primary component carrier in accordance with the carrier aggregation policy of the identified set of reference channel information, wherein the one or more secondary communication channels of the carrier aggregation policy of the identified set of reference channel information are arranged in an ordered list.

12. A method comprising:
   obtaining a plurality of sets of training data, wherein each set of the training data comprises: first channel measurement data for a primary component carrier used for communications between a device and a network node of a mobile communication system; a primary channel identifier for said primary component carrier; and an ordered list of secondary channel identifiers for secondary component carriers for communications between the device and the network node;
   identifying one or more sets of reference data from the plurality of sets of training data, wherein each reference data set has a different combination of primary and secondary channel identifiers to all other sets of reference data;
   identifying one or more sets of matching data sets for each reference data set from the plurality of sets of training data, wherein each matching data set has a same combination of primary and secondary channel identifiers as the respective reference data set;
   identifying one or more sets of non-matching data sets for each reference data set from the plurality of sets of training data, wherein each non-matching data set has a different combination of primary and secondary channel identifier to the respective reference data set; and
   training trainable parameters of an algorithm with minimising a loss function until, for all sets of matching data, outputs of the algorithm in response to the matching data set are closer to an output of the algorithm in response to the corresponding reference data set than to an output of the algorithm in response to any other reference data set.

13. A computer program comprising instructions encoded on a non-transitory computer readable medium configured for causing an apparatus to perform at least the following:
   obtaining first channel measurement data for a primary component carrier used for communications between a device and a network node of a mobile communication system;
   providing the first channel measurement data as an input to an algorithm to obtain a first embedding output;
   comparing the first embedding output with embedding outputs of a plurality of reference channel measurement data input to said algorithm to identify a closest reference channel measurement data to the first channel measurement data;
   identifying a set of reference channel information associated with the identified closest reference channel measurement data, wherein the identified set of reference channel information comprises a carrier aggregation policy defining one or more secondary communication channels; and
   setting a carrier aggregation policy for the primary component carrier in accordance with the carrier aggregation policy of the identified set of reference channel information, wherein the one or more secondary communication channels of the carrier aggregation policy of the identified set of reference channel information are arranged in an ordered list.

14. A computer program comprising instructions encoded on a non-transitory computer readable medium configured for causing an apparatus to perform at least the method as claimed in claim 12.

* * * * *